United States Patent
Cheng

(10) Patent No.: US 7,044,043 B2
(45) Date of Patent: May 16, 2006

(54) APPARATUS FOR SIZING WINDOW COVERINGS

(75) Inventor: Li-Ming Cheng, Kaohsiung Hsien (TW)

(73) Assignee: King Koon Industrial Corp., Kaohsiung (TW)

(*) Notice: Subject to any disclaimer, the term of this patent is extended or adjusted under 35 U.S.C. 154(b) by 198 days.

(21) Appl. No.: 10/755,301

(22) Filed: Jan. 13, 2004

(65) Prior Publication Data

US 2005/0150342 A1    Jul. 14, 2005

(51) Int. Cl.
B23D 23/00 (2006.01)
B26D 5/08 (2006.01)
B26D 7/27 (2006.01)

(52) U.S. Cl. .................. 83/522.19; 83/620; 83/454; 83/452

(58) Field of Classification Search ............ 83/522.19, 83/197, 435.11, 452, 100, 375, 462, 622, 83/631, 454, 465, 620, 618, 619, 629, 627, 83/633, 485, 800, 433, 468.7, 639.1; 29/24.5, 29/433
See application file for complete search history.

(56) References Cited

U.S. PATENT DOCUMENTS

| | | | |
|---|---|---|---|
| 4,819,530 A * | 4/1989 | Huang | 83/39 |
| 5,103,702 A * | 4/1992 | Yannazzone | 83/29 |
| 5,339,716 A * | 8/1994 | Sands et al. | 83/452 |
| 5,816,126 A * | 10/1998 | Pluber | 83/167 |
| 5,927,172 A * | 7/1999 | Wang | 83/454 |
| 6,079,306 A * | 6/2000 | Liu | 83/454 |
| 6,604,443 B1 * | 8/2003 | Roberts et al. | 83/13 |
| 6,688,204 B1 * | 2/2004 | Huang | 83/622 |
| 6,945,152 B1 * | 9/2005 | Jabbari et al. | 83/468.7 |

* cited by examiner

Primary Examiner—Allan N. Shoap
Assistant Examiner—Ghassem Alie
(74) Attorney, Agent, or Firm—Rosenberg, Klein & Lee

(57) ABSTRACT

An apparatus for sizing at a single workstation pleated shades and mini blinds in a particular dimension uses a sizing device that includes hydraulic actuated horizontal and vertical blades and a cutting rail assembly. The hydraulic actuated horizontal and vertical blades are used to respectively cut the components of a pleated shade or a mini blind, such as head rails, bottom rails and a pleated blind or aluminum slats. The horizontal and the vertical blades are sequentially operated to prevent the blades from colliding with each other. The cutting rail assembly has multiple stacked guiding blocks so that the pleated shade and the mini blind can be held in different tiers and be simultaneously cut at the single workstation.

10 Claims, 8 Drawing Sheets

US 7,044,043 B2

1

APPARATUS FOR SIZING WINDOW COVERINGS

BACKGROUND OF THE INVENTION

1. Field of the Invention

The present invention relates to an apparatus for sizing window coverings, and more particularly to an apparatus for sizing at a single workstation pleated shades and mini blinds.

2. Description of Related Art

Numerous types of window coverings can be found in a variety of window accessory stores or outlets. Mass products of window coverings are often manufactured with a variety of standard sizes in the factories. However, not all window dimensions, especially in newer homes and offices are standard dimensions. Some of the outlets sell custom specialty window coverings where the customer is asked for the window dimensions and then those requirements are sent to the factories where the window coverings with specific dimensions are manufactured. However, the custom specialty window coverings are generally more expensive than the standard ones due to the individual work involved.

Another option available for the customer is to obtain a specific sized window covering. The option involves sizing the standard coverings to customer specifications in the stores. Different types of window coverings require different sizing apparatus. However, the pleated shades and the mini blinds comprise similar components, such as common head rails and bottom rails, but the pleated shades use pleated blinds, and the mini blinds use many arranged aluminum slats.

Therefore, the present invention concerns to provide a single workstation sizing apparatus for cutting not only the pleated shades but also the mini blinds, and such a sizing apparatus is convenient to use and is not costly to the store owner.

SUMMARY OF THE INVENTION

The main objective of the invention is to provide an apparatus at a single workstation for sizing pleated shades and mini blinds in a particular dimension. The apparatus uses a sizing device that includes hydraulically actuated horizontal and vertical blades and a cutting rail assembly. The hydraulically actuated horizontal and vertical blades are used to respectively cut the components of a pleated shade or a mini blind, such as head rails, bottom rails and a pleated blind or aluminum slats. The horizontal and the vertical blades are sequentially operated to prevent the blades from colliding with each other. The cutting rail assembly has multiple stacked guiding blocks so that the pleated shade and the mini blind can be held in different tiers. The apparatus in accordance with the present invention is capable to cut either the pleated shade or the mini blind at a single workstation.

Other objectives, advantages and novel features of the invention will become more apparent from the following detailed description when taken in conjunction with the accompanying drawings.

2

Figure 2:
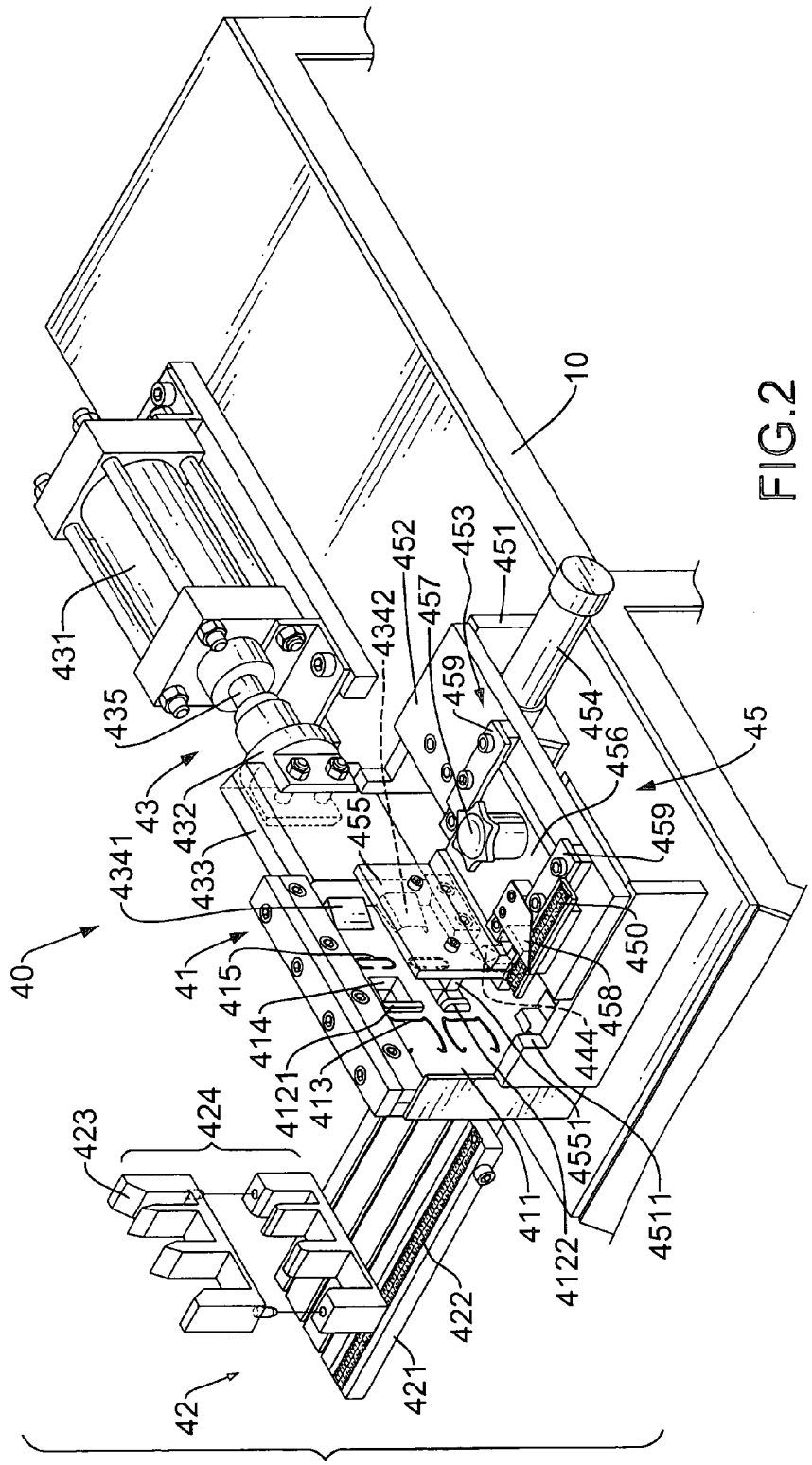
FIG. 2 is a perspective view of a sizing device of an apparatus in accordance with the present invention.
Figure 3:
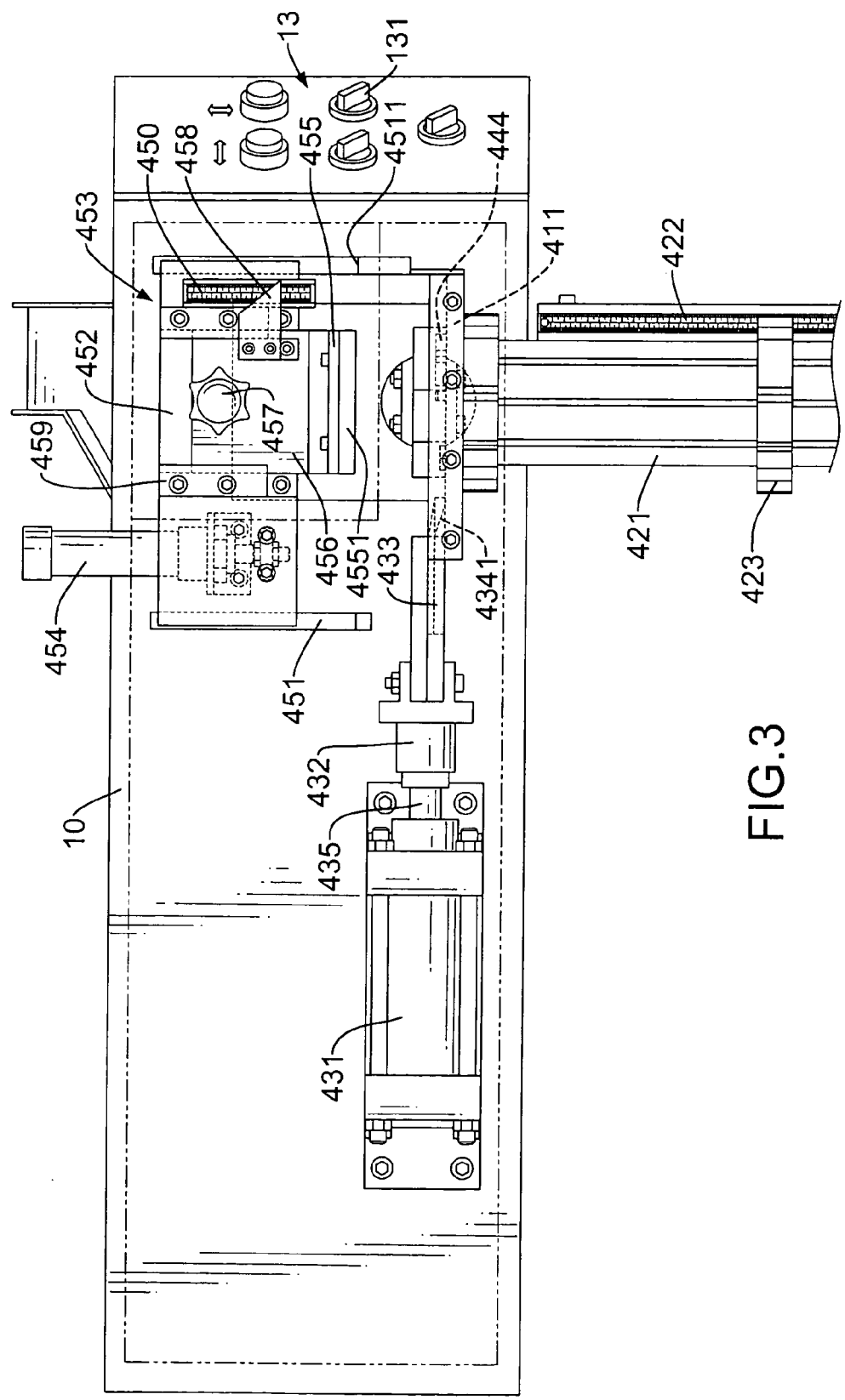
FIG. 3 is a top plan view of the sizing device in FIG. 2.
Figure 4:
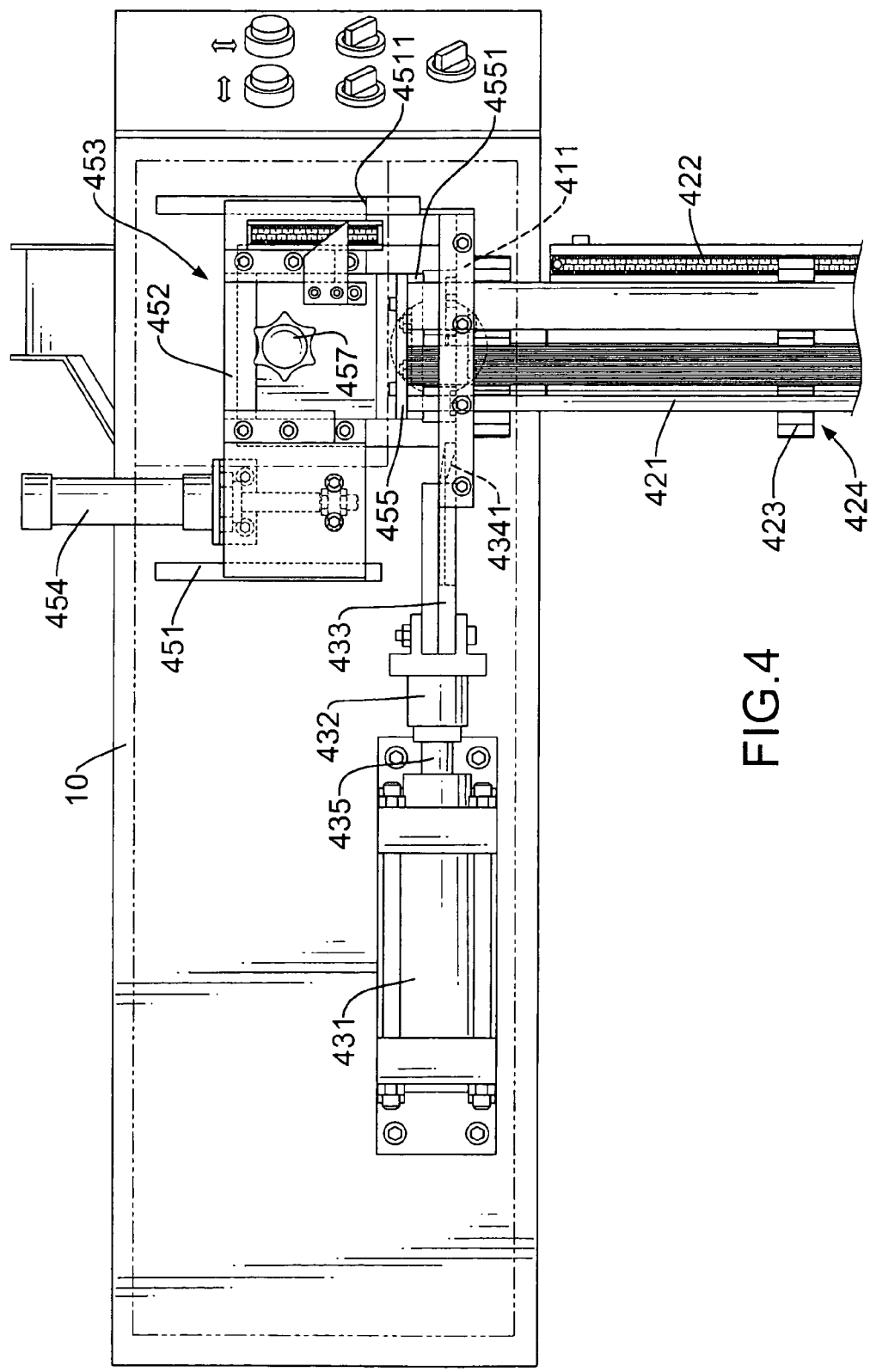
Figure 5:
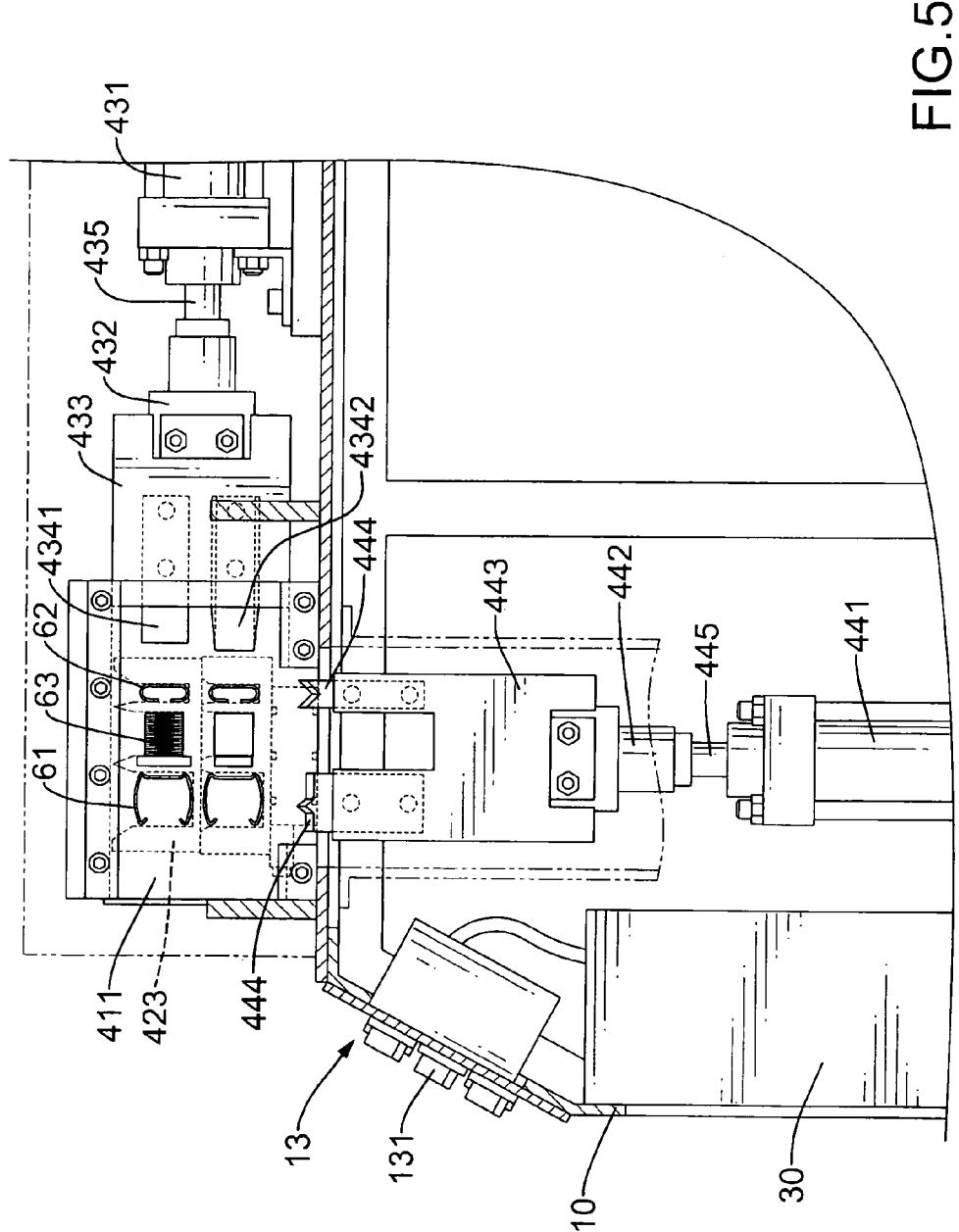
Figure 6:
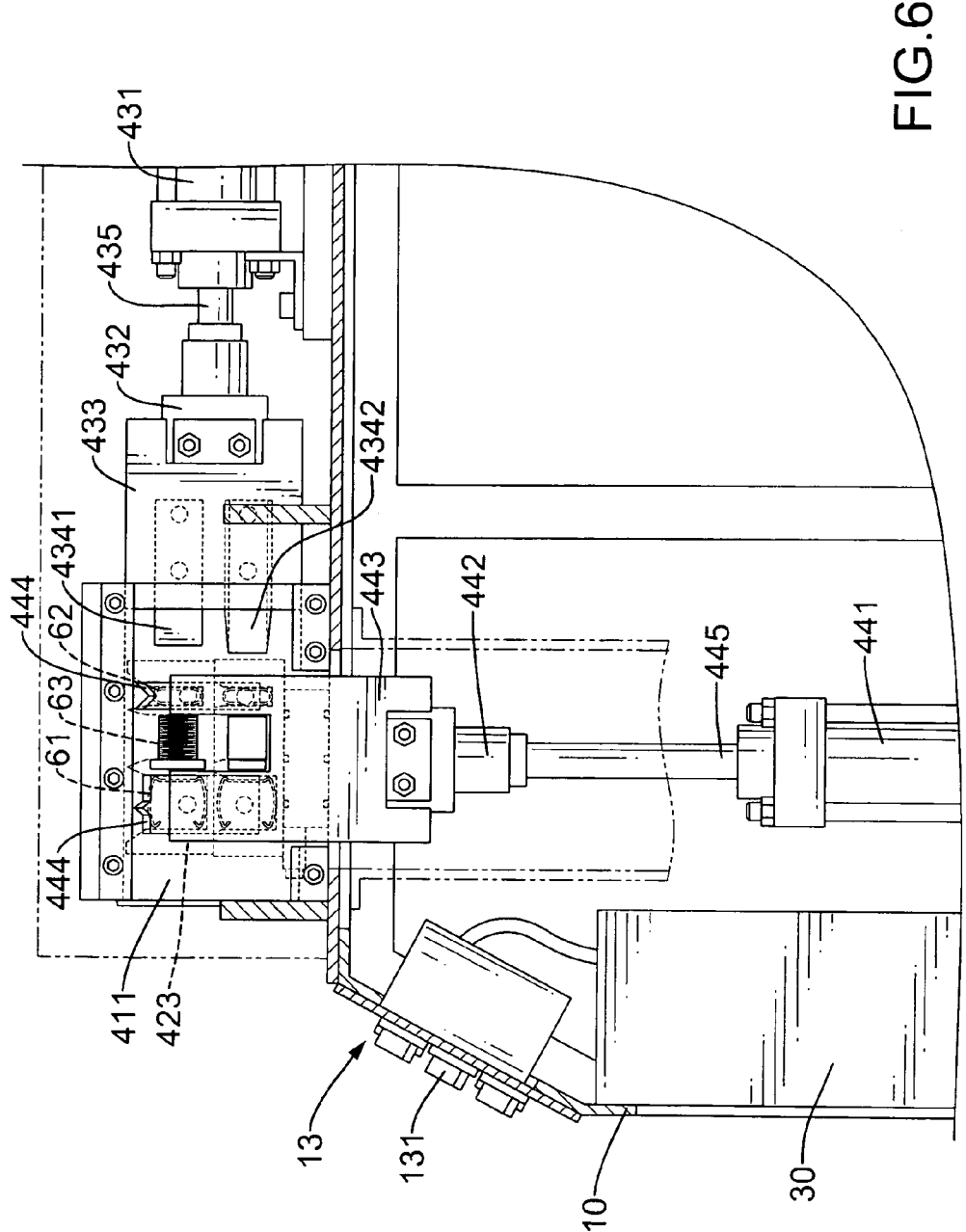
Figure 7:
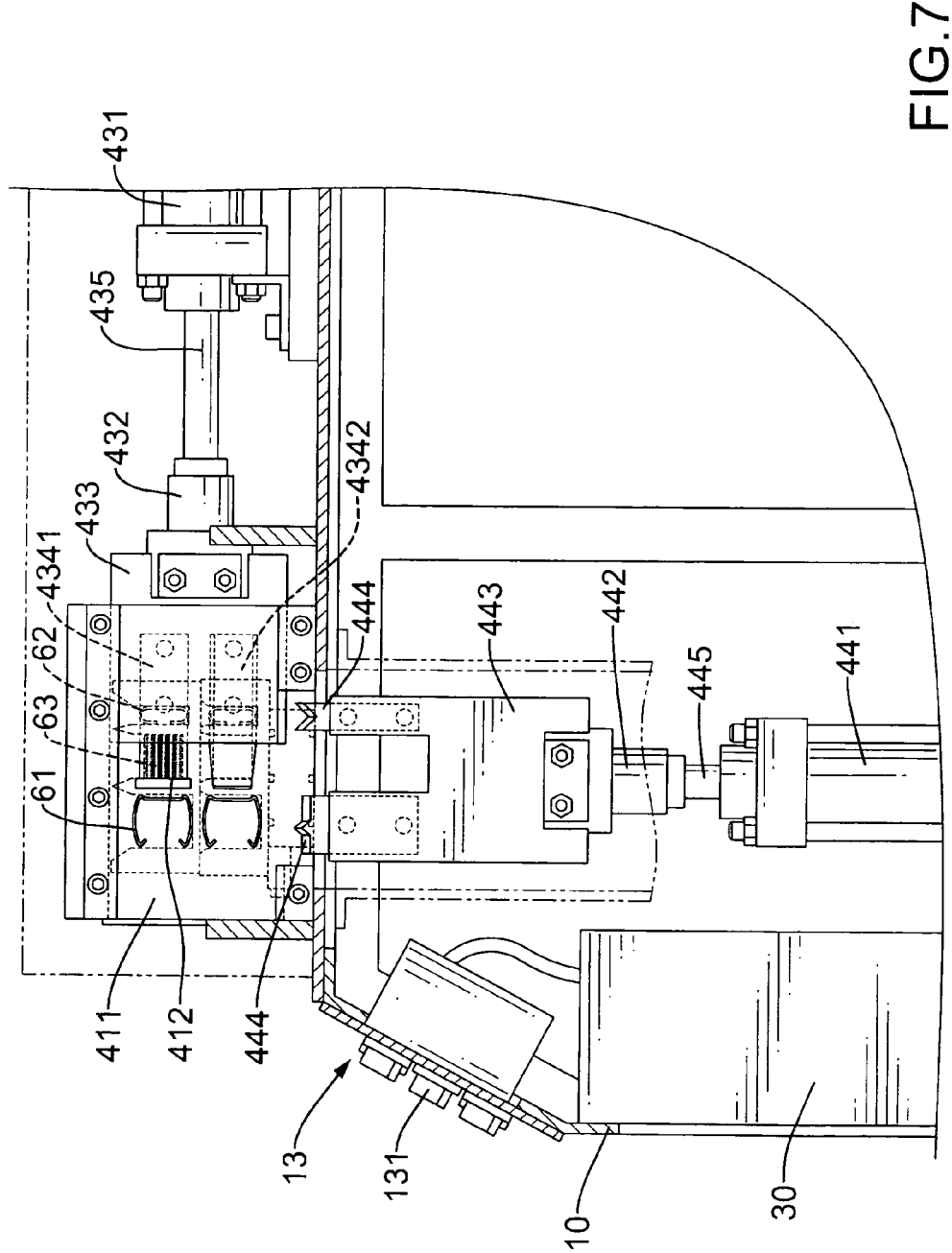
Figure 8:
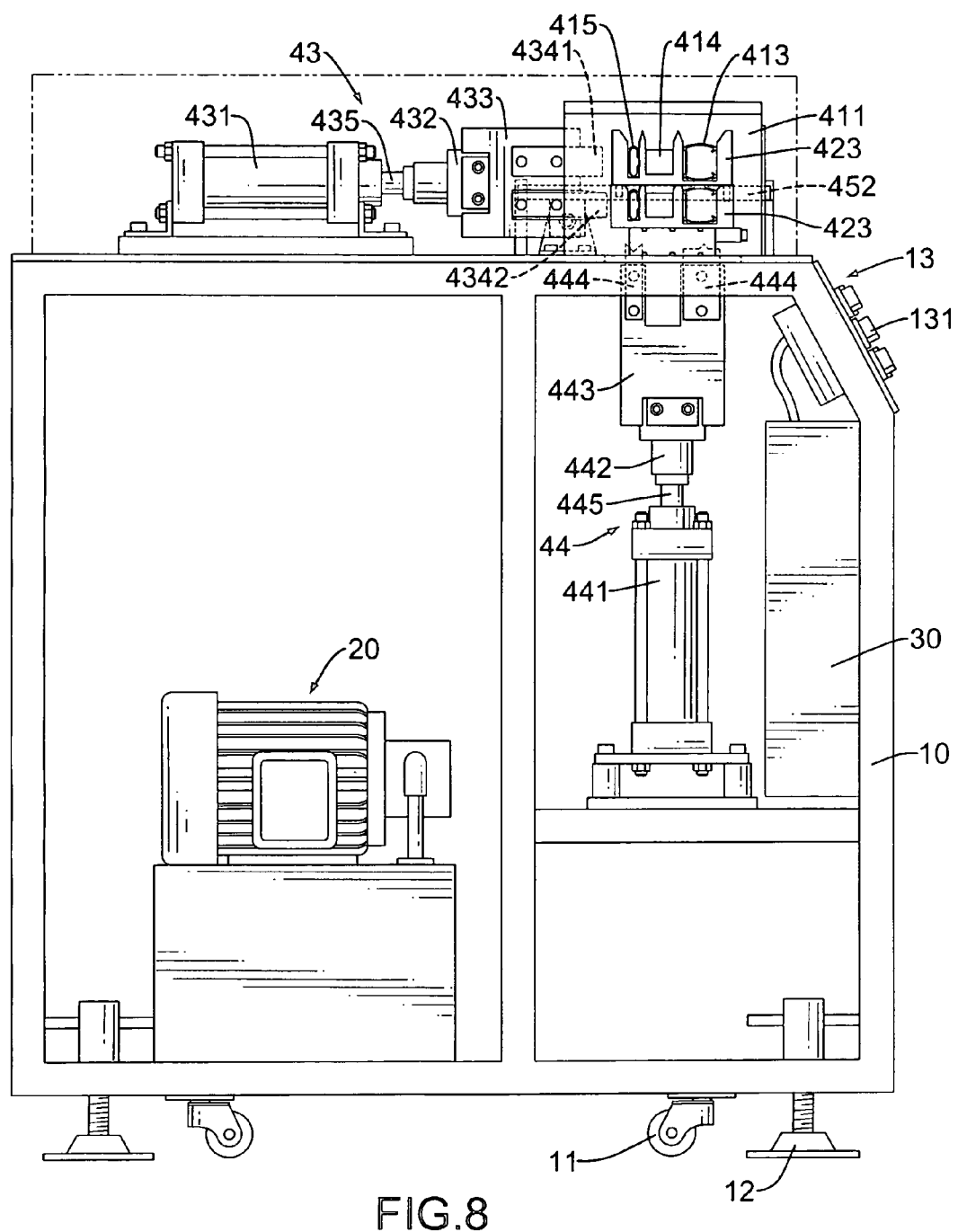

FIG. 4 is an operational top plan view of the sizing device in FIG. 3 when a sliding seat of the sizing device is moved to prepare a cut;

FIG. 5 is a front plan view of the sizing device in FIG. 2, especially in partial cross section;

FIG. 6 is an operational front plan view of the sizing device in FIG. 5 when vertical blades are fed upward to cut head rails and bottom rails;

FIG. 7 is an operational front plan view of the sizing device in FIG. 5 when horizontal blades are fed to cut pleated components of a pleated shade and blind; and FIG. 8 is a rear plan view of the apparatus in accordance with the present invention.

DETAILED DESCRIPTION OF PREFERRED EMBODIMENT

An apparatus in accordance with the present invention is used to size pleated shades and mini blinds at a single workstation. For convenient illustrating purpose only, a detailed description of sizing a pleated shade is provided as follows to explain principles in accordance with the present invention.

Figure 1:
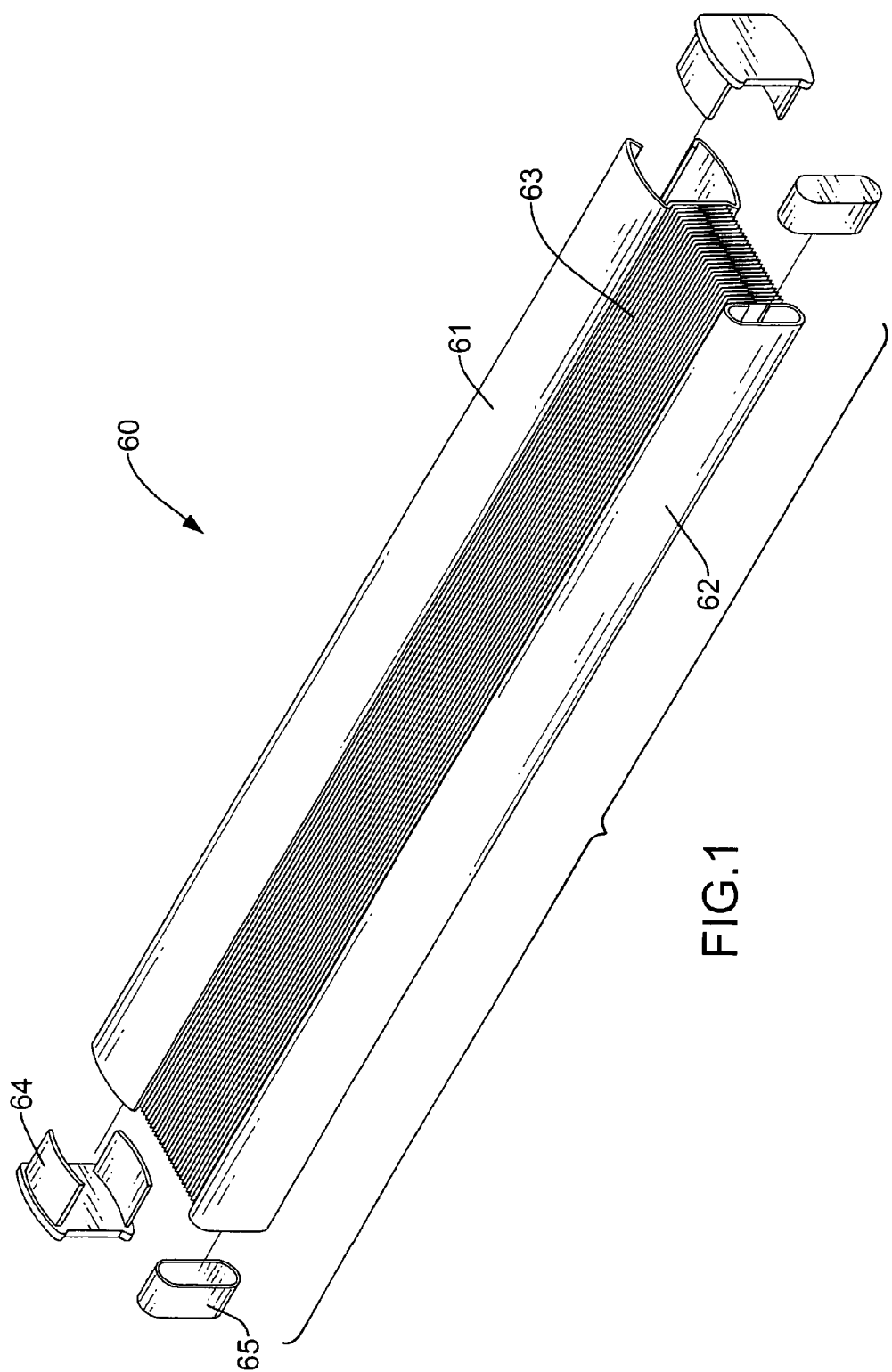
FIG. 1 is an exploded perspective view of a pleated shade.

With reference to FIG. 1, a pleated shade (60) comprises a head rail (61), a bottom rail (62), a flat pleated blind (63), two head rail end caps (64) and two bottom rail end caps (65). The head rail (61) has two ends (not numbered) and a bottom edge (not numbered). The head rail end caps (64) are respectively inserted in the ends of the head rail (61). The bottom rail (62) has a top edge (not numbered) and two ends (not numbered). The bottom rail end caps (65) are respectively inserted into the ends of the bottom rail (62). The pleated blind (63) is attached to the bottom edge of the head rail (61) and the top edge of the bottom rail (62).

With reference to FIGS. 1, 2 and 8, an apparatus in accordance with the present invention for sizing the pleated shade (60) comprises a frame (10), a hydraulic actuator (20), a control box (30) and a sizing device (40). The frame (10) may be a cart frame and has a top (not numbered), a bottom (not numbered), an inner space (not numbered), multiple cart wheels (11), mounting feet (12) and a control panel (13). The cart wheels (11) and the mounting feet (12) are mounted on the bottom of the frame (10). The frame (10) can use either the cart wheels (11) or the mounting feet (12) to stand on a surface, such as the ground. The control panel (13) is mounted adjacent to the top of the frame (10) and has multiple switches (131) for operating the sizing device (40).

The hydraulic actuator (20) may be an oil pump and generates power to actuate the sizing device (40). The hydraulic actuator (20) is mounted in the inner space of the frame (10). The control box (30) is mounted in the inner space of the frame (10) and electrically connects to the hydraulic actuator (20) to program a sequence of operations of the sizing device (40). The control box (30) also electrically connects to the switches (131) so that a person can press the switches (131) to perform the operations of the sizing device (40).

The sizing device (40) is assembled on the top of the frame (10) and comprises a cutting block (41), a cutting rail assembly (42), a horizontal cutter assembly (43), a vertical cutter assembly (44), and an inner measurement assembly (45). The cutting block (41) is fastened vertically on the top of the frame (10) and comprises a working block (411), an upper cutter anvil (4121) and a lower cutter anvil (4122). The working block (411) is fastened vertically on the top of the frame (10) and has a front (not numbered), a rear (not numbered), a side (not numbered), a row of upper slots (not numbered) and a row of lower slots (not numbered). The rows of upper and lower slots are defined through the front to the rear of the working block (411). Each of the rows of upper and lower slots comprises a head rail slot (413), a center window (414) and a bottom rail slot (415) that are aligned along a horizontal line relative to the top of the frame (10). The center window (414) is formed between the head rail slot (413) and the bottom rail slot (415) and has a first side (not numbered) and a second side (not numbered) opposite to the first side. The head rail slots (413) of the rows of upper and lower slots are aligned with each other in a vertical direction relative to the top of the frame (10). Likewise, the center windows (414) of the rows of upper and lower slot are aligned with each other in the vertical direction. The bottom rail slots (415) of the rows of upper and lower slot are aligned with each other in the vertical direction.

The head rail slots (413) and the bottom rail slots (415) are used to respectively hold the head rails and the bottom rails of a pleated shade and a mini blind. The center windows (414) are used to respectively hold the pleated materials, such as the pleated blind (63) of the pleated shade (60) and the aluminum slats of the mini blind. The upper cutter anvil (4121) is attached to the front of the working block (411) at the first side of the center window (414) of the row of upper slots. The lower cutter anvil (4122) is attached to the front of the working block (411) at the first side of the center window (414) of the row of lower slots, aligned with the upper cutter anvil (4122) in the vertical direction and has a curved shape.

The cutting rail assembly (42) is mounted on the top of the frame (10) at the rear of the working block (411) and comprises a supporting rail (421), a ruler (422) and multiple guiding blocks (423). The supporting rail (421) is mounted on the top of the frame (10) at the rear of the working block (411) and has a horizontal top (not numbered). The ruler (422) is horizontally attached to the top of the supporting rail (421) for double accuracy. The user can double-check the length of the pleated shade or the mini blind with the ruler (422) before cutting. The guiding blocks (423) are demountably mounted on the top of the supporting rail (421) along the ruler (422), and each pair of the guiding blocks (423) is detachably arranged in a stack (424). The stacks (424) are mounted on the top of the supporting rail (421) and are aligned one by another. Each of the guiding blocks (423) has multiple transverse passages (not numbered). The transverse passages in the lower guiding blocks (423) of the stacks (424) are respectively aligned with slots (413, 414, 415) of the row of lower slots in the working block (411). Likewise, the transverse passages in the upper guiding blocks (423) of the stacks (424) are respectively aligned with the slots of the row of upper slots in the working block (411). The tiered guiding blocks (423) in the stacks (424) allow the cutting rail assembly (42) to be capable of holding the pleated shade (60) and the mini blind in different tiers. For example, the passages of the lower tier guiding blocks (423) of the stacks (424) in the preferred embodiment are used to respectively hold the components of the mini blind, such as the head rail, the aluminum slats and the bottom rail. The passages of the upper tier guiding blocks (423) of the stacks (424) in the preferred embodiment are used to respectively hold the components of the pleated shade (60), such as the head rail (61), the pleated blind (63) and the bottom rail (62).

The horizontal cutter assembly (43) is mounted on the top of the frame (10) and comprises a horizontal cylinder (431), a horizontal connector (432), a horizontal cutter holder (433), a horizontal blind cutting blade (4341) and a horizontal slat cutting blades (4342). The horizontal cylinder (431) is mounted on the top of the frame (10), is actuated by the actuator (20) and controlled by the control box (30) and has a horizontal push rod (435). The horizontal push rod (435) has an outside end (not numbered). The horizontal connector (432) is attached to the outside end of the horizontal push rod (435). The horizontal cutter holder (433) is mounted on the horizontal connector (432) and is slidably mounted on the front of the working block (411). The horizontal blades (4341, 4342) are attached on the horizontal cutter holder (433), are sited at the second sides of the center windows (414) and are respectively aligned with the cutter anvils (4121, 4122). The horizontal slat cutting blade (4342) has a curved cutting edge corresponding to the curved shape of the lower cutter anvil (4122). Such a design of the curved cutting blade (4342) and the curved cutter anvil (4122) is used to trim end corners at each end of the aluminum slats of the mini blind.

Therefore, when the horizontal cylinder (431) is actuated, the horizontal push rod (435) will be retracted into or extend out of the horizontal cylinder (431) to cause a horizontal movement of the horizontal blades (4341, 4342) relative to the top of the frame (10). The horizontal cutting blades (4341, 4342) will be extended respectively toward the cutter anvils (4121, 4122) and cross the center windows (414) to cut any protrusion from the front of the working block (411).

The vertical cutter assembly (44) has a similar structure to the horizontal cutter assembly (43) and is mounted vertically in the inner space of the frame (10). The vertical cutter assembly (44) comprises a vertical cylinder (441), a vertical connector (442), a vertical cutter holder (443) and two vertical cutting blades (444). The vertical cylinder (441) is mounted vertically in the inner space of the frame (10), is actuated by the actuator (20) and controller by the control box (30), and has a vertical push rod (445). The vertical push rod (445) has an outside end (not numbered). The vertical connector (442) is attached to the outside end of the vertical push rod (445). The vertical cutter holder (443) is mounted on the vertical connector (442) and is slidably mounted on the front of the working block (411). The vertical blades (444) are attached on the cutter holder (443) and are respectively aligned with the aligned head rail slots (413) and aligned with the bottom rail slots (415).

Therefore, when the vertical cylinder (441) is actuated, the vertical push rod (445) will be retracted into or extend out of the vertical cylinder (441) to cause a vertical movement of the vertical blades (444) relative to the top of the frame (10). The vertical blades (444) will be extended upward and respectively cross the head rail slots (413) and the bottom rail slots (415) to cut any protrusions from the front of the working block (411).

The inner measurement assembly (45) is mounted on the top of the frame (10) at the front of the working block (411) and comprises a stationary bracket (not numbered), a sliding seat (452), an index device (453) and an index cylinder (454). The stationary bracket comprises two parallel wings (451). The wings (451) are perpendicularly mounted on the top of the frame (10) and are parallel to each other toward the front of the working block (411). Each of the wings (451) has a top edge (not numbered) and a stop (4511). The stop (4511) protrudes from the top edge at a position adjacent to the working block (411). The sliding seat (452) is slidably mounted on the top edges of the wings (451) and has a top (not numbered).

The index device (453) is mounted on the top of the sliding seat (452) and comprises a measurement plane (455), an inner ruler (450), an adjusting block (456), a locking knob (457), a pointer (458) and two mounting brackets (459). The mounting brackets (459) are on the top of the sliding seat (452) and are parallel to each other. The inner ruler (450) is mounted on the top of the sliding seat (452) alongside one of the mounting brackets (459). The adjusting block (456) is slidably held by the mounting brackets (459) and has an outer edge (not numbered) and a top (not numbered). The outer edge of the adjusting block (456) extends out of the sliding seat (452) toward the front of the working block (411). The locking knob (457) is rotatably mounted on the top of the adjusting block (456) and can be turned to retract into the adjusting block (411) to interlock the adjusting block (411) with the sliding seat (452) in position. The pointer (458) is mounted on the top of the adjusting block (456) and crosses over the inner ruler (450) to indicate a value of the inner ruler (450). The measurement plane (455) is fastened on the outer edge of the adjusting block (456) and has a basis flat (not numbered). The basis flat faces toward and is parallel to the front of the working block (411). Optionally, the measurement plane (455) may further comprise two transverse bars (4551) mounted on the basis flat and respectively below the center windows (414) of the rows of upper and lower slots.

The index cylinder (454) is mounted on the top of the frame (10) and connects to the sliding seat (452) to move the sliding seat (452) frontward and backward relative to the front of the working block (411). The movement of the sliding seat (452) simultaneously moves the measurement plane (455) frontward and backward relative to the front of the working block (411).

The sequence of operations of the sizing device (40) can be performed by pressing the switches (131) on the panel (13) so that the control box (30) controls the actuator (20) to sequentially actuate the cylinders (431, 441, 454). With reference to FIGS. 1 and 3, the pleated shade (60) can be sized by the apparatus in accordance with the present invention, the end caps (64, 65) of the pleated shade (60) should be removed from the head rail (61) and the bottom rail (62). The next step is to loosen the locking knob (457) to adjust the adjusting block (456) relative to the sliding seat (452) and move the adjusting block (456) frontward or backward to acquire a desired cutting length. For example, if the pleated shade (60) needs to have one inch off, the operator moves the adjusting block (456), which simultaneously moves the pointer (458) to a half inch mark on the inner ruler (450), and then the locking knob (457) is tightened to interlock the adjusting block (456) with the sliding seat (452). A half inch cut on both sides of the pleated shade (60) results in a total of one inch being removed from the shade (60).

With reference to FIGS. 2, 4 and 5, the sliding seat (452) is moved to abut the stops (4511) on the wings (451) by the actuated index cylinder (454). The next step is to separate and place respectively the head rail (61), the bottom rail (62) and the pleated blind (63) in the passages of the upper tier guiding blocks (423) of the stacks (424). The head rail (61), the bottom rail (62) and the pleated blind (63) in the passages of the guiding blocks (423) are respectively inserted into the head rail slot (413), the center window (414) and the bottom rail slot (415) of the row of upper slots and then are pushed against the basis flat of the measurement plane (455).

With reference to FIGS. 2 and 6, the sliding seat (452) is moved backward by the index cylinder (454), which simultaneously moves the measurement plane (455) backward to allow the horizontal and vertical cutting blades (4341, 4342, 444) to cut. The vertical cylinder (441) is actuated to extend the vertical push rod (445) to push the vertical cutting blades (444) upward. The moving vertical cutting blades (444) will cut the protrusions of the head rail (61) and the bottom rail (62) that are held in the head rail slot (413) and the bottom rail slot (415) in the working block (411) as the vertical cutting blades (444) encounter against the head rail (61) and the bottom rail (62). Then, the vertical cylinder (441) retracts the vertical push rod (445) to return the vertical cutting blades (444) to their initial positions.

With reference to FIGS. 2 and 7, after the vertical cutting operation is completed, the horizontal cylinder (431) is actuated to extend the horizontal push rod (435). The horizontal cutting blades (4341, 4342) are moved toward the cutter anvils (4121, 4122) and cut the protrusion of the pleated blind (63) that is held in the center window (414) of the working block (411) as the horizontal blind cutting blades (4341) encounter the pleated blind (63). At this state, the cutting operation of the pleated shade (60) is completed. The horizontal cylinder (431) retracts the horizontal cutting blades (4341, 4242) to their initial positions. After both sides of the pleated shade (60) have been cut, the end caps (64, 65) are reinserted in the head rail (61) and the bottom rail (62) to complete sizing the pleated shade (60). Since the vertical and the horizontal cutting operations are programmed in order, the vertical cutting blades (444) and the horizontal cutting blades (4341, 4342) are kept from simultaneously operating to avoid the blades (444, 4341, 4342) from colliding into each other and damaging themselves.

Consequently, the apparatus in accordance with the present invention can size the pleated shade and the mini blind at a single workstation. The stacked guiding blocks (423) permit the pleated shade and the mini blind to be respectively held at different tiers so that they can be cut at the single workstation. Thus, it is clear that the apparatus is especially convenient to operate.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the scope of the appended claims.

What is claimed is:

1. An apparatus for sizing window coverings, and the apparatus comprising:

a frame having a top and a control panel;

a control box mounted in the frame and electrically connected to the control panel;

an actuator mounted in the frame and electrically connected to the control box;

a sizing device assembled on the top of the frame and comprising a cutting block fastened vertically on the top of the frame and comprising a working block fastened vertically on the top of the frame and having a front, a rear, a row of upper slots and a row of lower slots, the row of upper slots and the row of lower slots defined through the front to the rear and respectively comprising a head rail slot, a center window and a bottom rail slot that are horizontally arranged relative to the top of the frame;

a cutting rail assembly mounted on the top of the frame at the rear of the working block and comprising
a supporting rail mounted at the rear of the working block and having a horizontal top; and
multiple stacks demountably mounted on the top of the supporting rail, each of the stacks comprising an upper guiding block and a lower guiding block, each of the guiding blocks having multiple transverse passages, and the transverse passages of the lower guiding blocks respectively aligned with the head rail slot, the center window and the bottom rail slot of the row of lower slots in the working block and the transverse passages of the upper guiding blocks respectively aligned with the head rail slot, the center window and the bottom rail slot of the row of upper slots in the working block;
a horizontal cutter assembly mounted on the top of the frame and comprising two horizontal cutting blades actuated by the actuator and aligned respectively with the center windows; and
a vertical cutter assembly vertically mounted in the top of the frame and comprising two vertical cutting blades actuated by the actuator and respectively aligned with the head rail slots and the bottom rail slots.

2. The apparatus as claimed in claim 1, wherein the sizing device further comprises an inner measurement assembly mounted on the top of the frame at the front of the working block and the inner measurement assembly comprising
a stationary bracket mounted on the top of the frame;
a sliding seat with a top slidably mounted on the stationary bracket;
an index device mounted on the top of the sliding seat and comprising
two parallel mounting brackets on the top of the sliding seat;
an inner ruler mounted on the top of the sliding seat along one of the mounting brackets;
an adjusting block slidably held by the mounting brackets and having an outer edge extended out of the sliding seat toward the front of the working block and a top;
a measurement plane fastened on the outer edge of the adjusting block and having a basis flat parallel to the front of the working block;
a locking knob mounted on the top of the adjusting block to interlock the adjusting block with the sliding seat in position; and
a pointer mounted on the top of the adjusting block to indicate a value of the inner ruler.

3. The apparatus as claimed in claim 2, wherein the horizontal cutter assembly further comprises
a horizontal cylinder mounted on the top of the frame, actuated by the actuator and controlled by the control box and having a horizontal push rod with an outside end;
a horizontal connector attached to the outside end of the horizontal push rod; and
a horizontal cutter holder mounted on the horizontal connector and slidably mounted on the front of the working block;

the vertical cutter assembly further comprises
a vertical cylinder mounted on the top of the frame, actuated by the actuator and controlled by the control box and having a vertical push rod with an outside end;
a vertical connector attached to the outside end of the vertical push rod; and
a vertical cutter holder mounted on the vertical connector and slidably mounted on the front of the working block; and the inner measurement assembly further comprises an index cylinder mounted on the top of the frame and connected to the sliding seat to move the sliding seat frontward and backward relative to the front of the working block;
wherein the horizontal cutting blades are mounted on the horizontal cutter holder, and the vertical cutting blades are mounted on the vertical cutter holder.

4. The apparatus as claimed in claim 3, wherein one of the horizontal cutting blades has a curved cutting edge.

5. The apparatus as claimed in claim 1, wherein the cutting rail assembly further comprises a ruler horizontally attached on the top of the supporting rail relative to the top of the frame, and the stacks are arranged alongside the ruler.

6. The apparatus as claimed in claim 4, wherein the cutting rail assembly further comprises a ruler horizontally attached on the top of the supporting rail relative to the top of the frame, and the stacks are arranged alongside the ruler.

7. The apparatus as claimed in claim 1, wherein each of the center windows has a first side and a second side opposite to the first side; and
the cutting block further comprises an upper cutter anvil and a lower cutter anvil that are fastened vertically on the top of the frame at the first sides of the center windows and aligned respectively with the horizontal cutting blades;
wherein the horizontal cutting blades are sited at the second sides of the center windows.

8. The apparatus as claimed in claim 6, wherein each of the center windows has a first side and a second side opposite to the first side; and
the cutting block further comprises an upper cutter anvil and a lower cutter anvil that are fastened vertically on the top of the frame at the first sides of the center windows and aligned respectively with the horizontal cutting blades;
wherein the horizontal cutting blades are sited at the second sides of the center windows.

9. The apparatus as claimed in claim 8, wherein the lower cutter anvil is aligned with the horizontal cutting blade with curved cutting edge and has a curved shape corresponding to the curved cutting edge.

10. The apparatus as claimed in claim 9, wherein
the stationary bracket of the inner measurement assembly comprises two parallel wings perpendicularly mounted on the top of the frame, each of the wings has a top edge and a stop protruded from the top edge at a position adjacent to the working block; and
the sliding seat is slidably mounted on the top edges of the wings.

* * * * *